May 18, 1965     O. HÜBNER     3,183,538
PORTABLE ELECTRIC TOILET APPARATUS
Filed Nov. 23, 1962     3 Sheets-Sheet 1
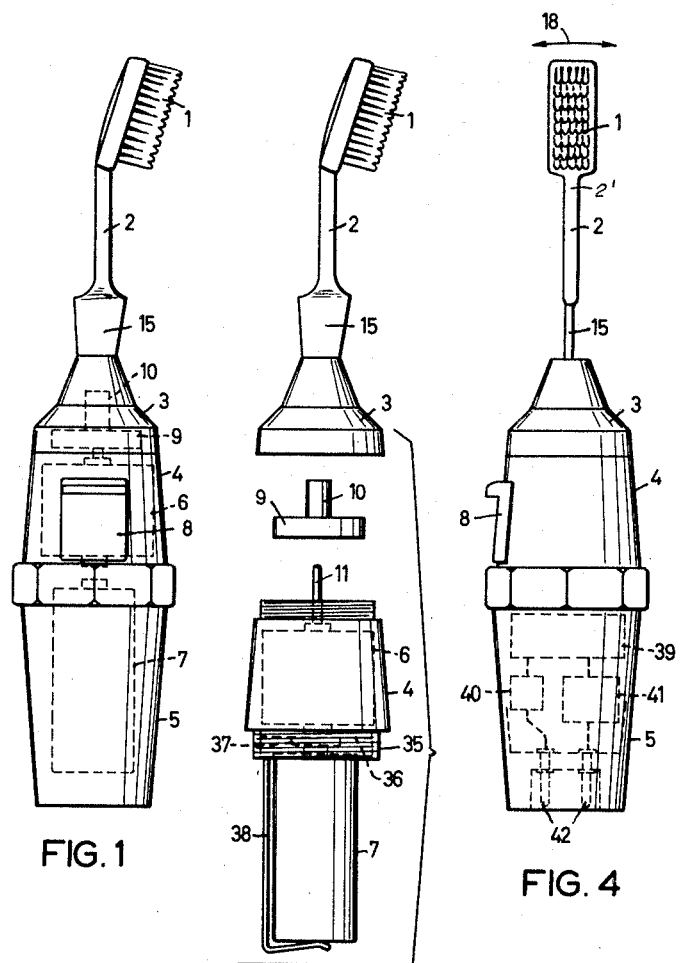
FIG. 1
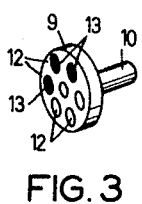
FIG. 3
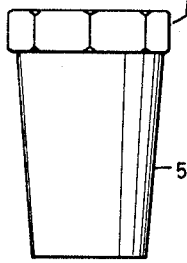
FIG. 2
FIG. 4

May 18, 1965          O. HÜBNER          3,183,538

PORTABLE ELECTRIC TOILET APPARATUS

Filed Nov. 23, 1962          3 Sheets-Sheet 2

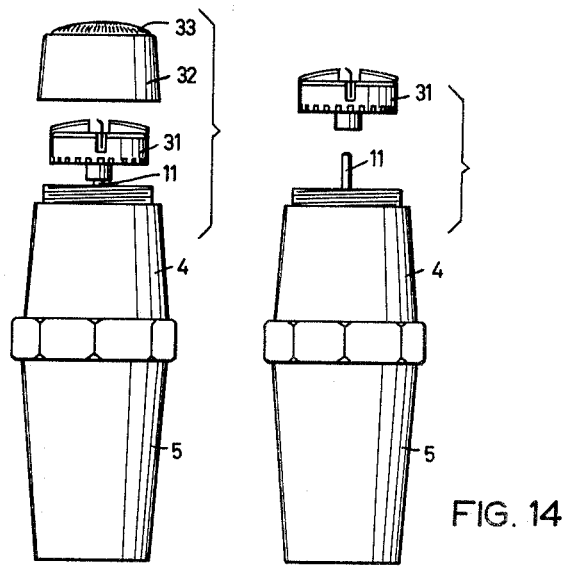
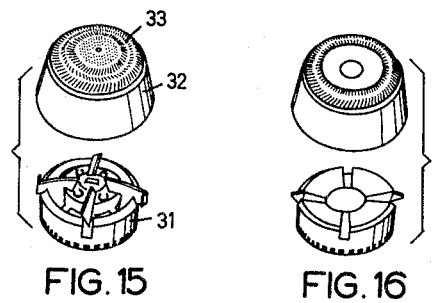
FIG. 13    FIG. 14
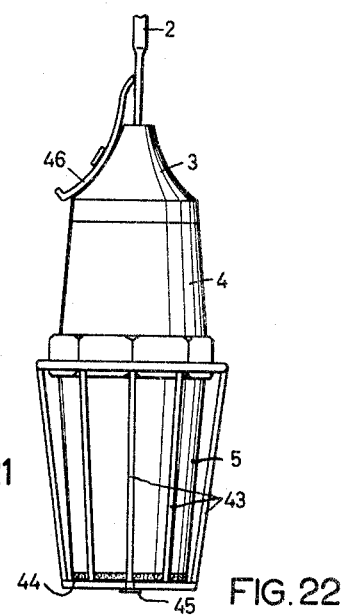
FIG. 15    FIG. 16
FIG. 17    FIG. 20
FIG. 18
FIG. 19    FIG. 21
FIG. 22

United States Patent Office 3,183,538
Patented May 18, 1965

3,183,538
PORTABLE ELECTRIC TOILET APPARATUS
Otto Hübner, Gruntal 33, Munich 27, Germany
Filed Nov. 23, 1962, Ser. No. 239,441
Claims priority, application Germany, Apr. 28, 1962,
H 45,624; Sept. 29, 1962, H 47,042
15 Claims. (Cl. 15—22)

This invention relates to electrically powered portable toilet apparatus, especially to tooth brush sets with motor driven vibrators.

An object of the invention is to provide an improved, versatile toilet apparatus adapted to operate with various exchangeable types of cosmetic instruments.

A more specific object of the invention is to provide means for accommodation of desired instruments with either rotary or vibratory action on the same apparatus and to drive such instruments with the same motor, if needed in cooperation with a vibrator disc coupled to the motor.

For efficient cleaning of the teeth and massage of the gums it is desired to have the bristles of a tooth brush vibrate up and down in the direction of the tooth gaps, i.e. in a vertical plane when holding the tooth brush set in horizontal position.

It is, therefore, a significant object of the invention to improve electric tooth brush sets by providing for a substantially linear brush vibration perpendicular to the bristles and avoiding circular and elliptic motions.

Another object of the invention is to provide a low-voltage current source disposed within the apparatus to ensure safe use, particularly in the human mouth, and so dispense with electric cords coupled to the apparatus during operation.

Further objects, features, and advantages of the invention will readily become apparent from the following description considered in connection with the accompanying drawings, in which FIG. 1 is a longitudinal view of one embodiment of a vibratory tooth brush constructed in accordance with my invention;

FIG. 2 is an exploded view of the embodiment shown in FIG. 1;

FIG. 3 is a perspective view of the vibrator disc shown in FIGS. 1 and 2 and forming part of my invention;

FIG. 4 is a longitudinal view of a second embodiment of my invention;

FIG. 13 is a partly exploded longitudinal view of another embodiment of my invention in which the vibrator disc is removed and the tooth brush or massage elements in the embodiments and modifications of the preceding figures are replaced by a cutting head assembly for shaving;

FIG. 14 is a view similar to FIG. 13 with the guard cap removed and the rotary blade of the cutting head assembly detached from the rotary shaft of the driving mechanism;

FIGS. 15 and 16 show exploded views of the cutting head assembly shown in FIG. 13 and of a modified form thereof used for cutting longer hair;

Figure 5:
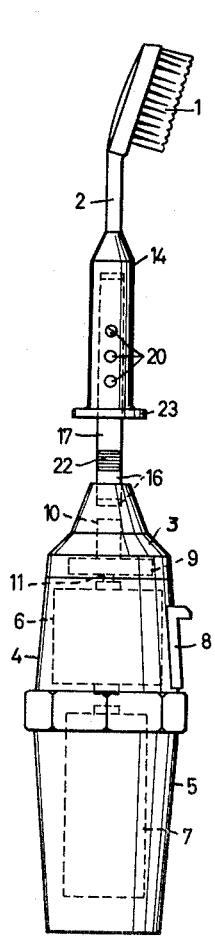
FIGS. 5 and 6 are longitudinal views of the embodiment of FIG. 1, the vibratory mechanism of FIG. 5 and the tooth brush element of FIG. 6 being rotated through 90°, showing a modification of the means of attaching and releasing the tooth brush element from the vibratory mechanism.

FIGS. 17 to 21 inclusive are perspective views, respectively of emery drum, spot cutter, shaping disc, rubber tip and nail buffer elements that may be substituted for the cutting head assembly of the embodiment shown in FIG. 13; and FIG. 22 is a longitudinal view of yet another embodiment of my invention in which the tooth brush or other element is cut away and structural means are provided for altering the vibratory effects thereof.

Like characters of reference are used throughout the drawings to designate corresponding parts.

Referring now to FIGS. 1–4, a tooth brush 1 with a slightly bent handle 2 is shown secured to an adaptor cap 3. The handle may have a length of 2–4 inches. The bristle part corresponds to that of a normal brush. The adaptor cap is screwed on a tubular case consisting of a lower, cup-like part 5 and on upper part 4. Both parts are preferably made of synthetic plastic material. They are substantially in alignment with the brush handle, and the case is designed to fit into the human hand. As shown particularly in FIG. 2, the adaptor cap will be screwed on the upper part 4 of the case, while part 5 may be screwed on, as shown at 35, or otherwise detachably connected with part 4.

The upper part 4 is sealed on both sides and may be considered as a moisture-proof power unit. It contains a suitable motor 6 powered by a battery 7 arranged within the lower part 5. In an insulating disc 36 closing the power unit, a contact piece 37 is provided for electric connection of one of the motor leads, not shown, with the positive pole of the battery. The negative pole is connected with the other motor lead via a contact strap 38. An electric switch may be mounted on the power unit for control of the motor.

As can be seen from FIG. 2, the motor has a rotary shaft 11 protruding through the upper cover of the power unit. A vibrator disc 9 (see FIG. 3) with a hollow hub 10 is detachably mounted on the motor shaft. The disc may be made of plastic material and is provided with weights 13 mounted off center in bores 12. In operation, the vibrator transforms the rotation of the shaft to vibrations of the case which are imparted, by means of the adaptor cap 3, to the tooth brush.

As shown in FIG. 4, the bristled part of the brush, except the bristles proper, may be encased in a protecting cover 2' consisting of soft plastic or rubber. This serves to avoid the importation of vibrations to the teeth or gums by the hard material of the handle.

Instead of a primary battery, a gas-tight accumulator 39 may be arranged in the lower part 5 of the case, together with recharging means consisting of a rectifier 40 and a capacitor 41. For connection with an electric outlet, the plug of a cord may be inserted into a coupler socket 42.

In operation, the tooth brush set is held horizontally, as shown in FIG. 4, with the bristle ends adjacent the teeth of the user in a manner usual with normal tooth brushes. The bristles will then vibrate in a direction perpendicular to the horizontal plane in which the longitudinal axis of the tooth brush is disposed as shown by arrow 18 and thus will effect thorough cleaning and efficient massage. To achieve substantial vibration in this direction, the end of the handle, where secured to the adaptor cap, is provided with a flat broadened portion 15 lying in the aforementioned horizontal plane and perpendicular to the desired direction of vibration. Thus, when the tooth brush set is held in the normal horizontal position, vibration will be imparted to the bristles so as to brush the teeth in an upward and downward movement and not from side to side.

Figures 6, 6A, 7:
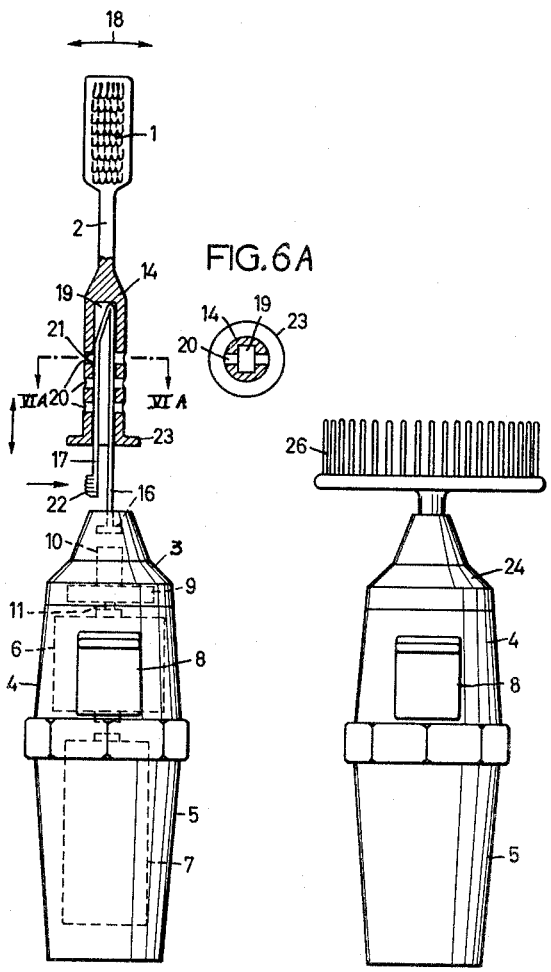
FIG. 6A is a cross-sectional view taken along the line VIA—VIA in FIG. 6.
FIG. 7 is a longitudinal view of still another embodiment of my invention in which the tooth brush element of the embodiment shown in the preceding figures is replaced by a face massage brush.

A modification of the tooth brush set just described is shown in FIGS. 5 and 6. The adapter cap 3 is now provided with an elongated flat resilient supporting element, consisting of a double-legged leaf spring 16 with a bent leg 17. The spring is secured to the adapter cap in a plane parallel to the bristles and perpendicular to the desired direction of vibration, designated by 18. The portion of the spring adjacent the adapter cap thus corresponds to the flat portion 15 of the brush handle shown in FIG. 4.

The modification shown in FIGS. 5 and 6 is particularly suited for substituting different tooth brushes if desired without removal of the adaptor cap. The handle 2 is formed with a hollow slide portion 19 provided with three openings or notches 20 for interaction with a pin or projection 21 mounted on the bent leg 17 of the leaf spring. By depressing this leg by means of a button 22, the tooth brush is easily released and may then be replaced by another brush.

The vibration amplitude can be varied by engaging the pin 21 with another one of the three notches 20.

The lower end of the brush handle carries a flange 23 for standing the detached brush upright. Furthermore, the flange affords protection against trickles of dentifrice.

The flat shape of the supporting element 16, e.g. designed as a leaf spring accomplishes effective transmitting of vibration energy to the tooth brush in such a way that only vibrations in a single plane will occur.

The new tooth brush set is easily adaptable for use as a massage apparatus. It is just needed to unscrew the adaptor cap 3 and to screw on another adaptor cap having an opening for insertion of various instruments, as will now be described in connection with FIGS. 7–12.

Figure 8:
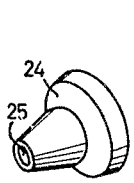
FIG. 8 is a perspective view of the adaptor cap forming part of the structure shown in FIG. 7.
Figure 9:
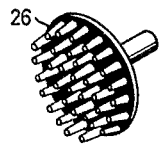
FIG. 9 is a perspective view of the face massage brush element of FIG. 7.
Figure 10:
FIGS. 10 to 12 are perspective views, respectively, of hemispherical, conical and suction disc elements that may be substituted for the massage brush in the embodiment of FIG. 7.
Figure 11:
Figure 12:
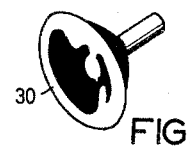

As shown in FIGS. 7 and 8, the apparatus is provided with an adaptor cap 24 having a central opening 25. The desired instruments e.g. a brush 26, are inserted into and firmly held in this opening by any suitable means such as friction fit or threads (not shown) and which will perform vibratory action as the vibrator disc 9 is still connected with the motor shaft and causes the case to vibrate.

Among other vibratory instruments, a multi-point disc 26 for face massage, a small half ball 27 and a cone 28, both for point treatment, and a suction disc 30 for treatment of neck, chin, and cheeks may be inserted in the adaptor cap. These instruments are shown in FIGS. 9–12, respectively.

A specific feature of the invention is the possibility to use the apparatus in connection with rotary cosmetic instruments. To convert the unit to an electric razor, it is only necessary to unscrew the adaptor cap 3 or 24, respectively, remove the detachable vibrator 9, insert the cutting blades, and screw on the foil cap. FIGS. 13 and 14 indicate how to convert the unit back: After unscrewing of foil cap 32 with foil 33, the cutting blades 31 are removed. FIGS. 15 and 16 show complete cutting heads for short and long hair, respectively.

Thus, the same power unit which is used for producing vibratory action can be utilized, by simply removing the vibrator disc, for driving rotary instruments. Instead of cutting heads, other such instruments may be accommodated by a special adaptor cap similar to that shown in FIG. 8 with a bore of larger diameter. Various manicure instruments can be inserted, their journals making positive connection with the motor shaft.

FIG. 17 shows an emery drum, FIG. 18 a spot cutter, FIG. 19 a shaping disc which can be equipped with different grinding inserts, FIG. 20 a rubber tip for cuticle removing, and FIG. 21 two kinds of buffers for nail polishing.

The lower part 5 of the case, which will be gripped by the hand, may be surrounded by a protector basket 43 to protect the hand from vibrations, as shown in FIG. 22. The basket is preferably secured to the bottom of part 5 by a stud 45, a damping disc 44 being placed between basket and case.

Another advantageous detail shown in FIG. 22 is a resilient adjusting member 46 for controlling the vibration amplitude of the tooth brush. The member is slidably mounted on the cap 3 and rests on the flat portion 15 of the handle 2.

While preferred embodiments of the invention have been described, it will be apparent that a person skilled in the art will well be able to make various changes in details of construction without departing from the scope of the invention.

What is claimed is:

1. An electric portable toilet apparatus, comprising a tubular case, a current source disposed in said case, a motor energizable by said current source, fixedly mounted in said case and having a rotary shaft extending in the axial direction of said case, a vibrator disc comprising eccentrically mounted weights located at one end of said case and adapted to be detachably mounted on said shaft for rotation therewith, first detachable means mountable at said one end of said case for connecting exchangeable vibratory cosmetic instruments with said case, and second detachable means mountable at said one end of said case for connecting exchangeable rotary cosmetic instruments directly with said rotary shaft after removal of said vibrator disc and said first detachable means.

2. An electric portable toilet apparatus, comprising a tubular case, a current source disposed in said case, a motor energizable by said current source mounted in said case and having a rotary shaft extending in the axial direction of said case, a vibrator disc located at one end of said case and detachably mounted directly on said shaft for rotation therewith, said vibrator disc having eccentrically disposed weights, a first adaptor cap for said case detachably mountable at said one end of said case for enclosing said vibrator disc therein, said first adaptor cap being adapted to interchangeably connect vibratory cosmetic instruments with said case, and a second adaptor cap for said case detachably mountable at said one end of said case, after removal of said vibrator disc and said first adaptor cap, and formed with a bore to accommodate interchangeable rotary toilet instruments for direct connection with said rotary shaft.

3. Apparatus according to claim 2, wherein at least one of said vibratory cosmetic instruments is a tooth-brush.

4. An electric tooth-brush set comprising a tubular case, a current source disposed in said case, a motor energized by said current source, fixedly mounted in said case and having a rotary shaft extending in the axial direction of said case, a vibrator disc comprising eccentrically mounted weights and adapted to be detachably mounted on said shaft, an adaptor cap detachably mounted on top of said case covering said vibrator disc, a tooth brush rigidly connected with said adaptor cap, the handle of said tooth brush, where connected with said adaptor cap, having a flat, broadened portion lying in a plane parallel to the bristles of said tooth brush, said flat, broadened portion being flexible in a direction perpendicular to said plane and relatively inflexible in the direction of said plane.

5. An electric toothbrush set comprising a tubular case, a current source disposed in said case, a motor energizable by said current source, fixedly mounted in said case and having a rotary shaft extending in the axial direction of said tubular case, a vibrator disc comprising eccentrically mounted weights and adapted to be detachably mounted on said shaft, an adaptor cap detachably mounted on top of said case covering said vibrator disc, a toothbrush, handle means securing said toothbrush to said adaptor cap, said handle means including a flat connecting portion adjacent said adaptor cap and lying in a plane parallel to the bristles of said toothbrush, said flat connecting portion being flexible in a direction perpendicular to said plane and relatively inflexible in the direction of said plane.

6. An apparatus as claimed in claim 3, the bristled portion of said tooth-brush being covered with soft protecting material.

7. A tooth brush set as claimed in claim 4, an adjusting member being mounted on said adaptor cap and influencing said flat, broadened portion of said handle for controlling the vibration amplitude of said brush.

8. An electric tooth-brush set comprising a tubular case, a current source disposed in said case, a motor energized by said current source, fixedly mounted in said case and having a rotary shaft extending in the axial direction of said case, a vibrator disc comprising eccentrically mounted weights and adapted to be detachably mounted on said shaft, an adaptor cap detachably mounted on top of said case covering said vibrator disc, an elongated flat resilient supporting element rigidly connected with said adaptor cap, and a tooth brush detachably mounted on said supporting element, the bristles of said tooth brush lying parallel to a plane in which said supporting element is disposed, said supporting element being flexible in a direction perpendicular to said plane and relatively inflexible in the direction of said plane.

9. A tooth brush set as claimed in claim 8, said tooth brush being longitudinally adjustable on said supporting element.

10. A tooth brush set as claimed in claim 8, said tooth brush and said supporting element having interacting latching means.

11. A tooth brush set as claimed in claim 8, said supporting element consisting of a bent double-legged leaf spring.

12. A tooth brush set as claimed in claim 11, the bent leg of said leaf spring having a latching projection releaseable by depressing of said leg.

13. A tooth brush set as claimed in claim 8, said tooth brush having a handle ending in a slide adapted to be slipped on said supporting element.

14. A tooth brush set as claimed in claim 13, the end of said slide having a flange for standing said tooth brush upright when detached.

15. An apparatus as claimed in claim 2, the lower portion of said case being provided with a basket protector for damping the vibration of said case.

References Cited by the Examiner

UNITED STATES PATENTS

| | | | |
|---|---|---|---|
| 955,339 | 4/10 | Lumsden | 128—36 |
| 1,188,823 | 6/16 | Plank | 15—110 |
| 1,833,967 | 12/31 | Groff | 128—62.1 |
| 2,135,933 | 11/38 | Blair | 128—48 |
| 2,206,726 | 7/40 | Lasater | 15—22 X |
| 2,253,210 | 8/41 | Psiharis | 15—110 X |
| 2,282,700 | 5/42 | Bobbroff | 15—22 |
| 2,319,205 | 5/45 | Buck | 15—22 |
| 2,808,602 | 10/57 | Gregoire | 15—28 |
| 2,977,614 | 4/61 | Demanuele | 15—22 |
| 3,012,263 | 12/61 | Miller | 15—28 |
| 3,021,468 | 2/62 | Reich | 320—2 |
| 3,027,507 | 3/62 | Hubner | 320—2 |
| 3,033,197 | 5/62 | Barckley. | |
| 3,034,376 | 5/62 | Gonzalex. | |

FOREIGN PATENTS

| | | |
|---|---|---|
| 1,133,470 | 11/56 | France. |
| 1,216,838 | 11/59 | France. |
| 899,618 | 6/62 | Great Britain. |

CHARLES A. WILLMUTH, *Primary Examiner.*